United States Patent [19]
Sturtevant et al.

[11] Patent Number: 5,100,506
[45] Date of Patent: Mar. 31, 1992

[54] CHEMICALLY MACHINED SHEET METAL CUTTING TOOLS AND METHOD

[75] Inventors: James Sturtevant, Dardanelle; Jeff Grace, Dover; Richard L. Grace, Russellville, all of Ark.

[73] Assignee: Grace Manufacturing Inc., Russellville, Ark.

[21] Appl. No.: 621,602

[22] Filed: Dec. 4, 1990

[51] Int. Cl.$^5$ .................. B44C 1/22; C23F 1/02; B24D 11/00; B23D 63/00

[52] U.S. Cl. ..................... 156/645; 29/76.1; 30/166.3; 51/204; 51/394; 51/309; 76/25.1; 76/112; 156/640; 156/661.1

[58] Field of Search ............ 156/645, 656, 659.1, 156/661.1, 640; 83/788; 51/204, 293, 309, 394, 395, 407; 30/166.3, 381, 388, 501, 503, 504; 29/76.1; 76/12, 21, 24.1, 25.1, 37, 112, 115, 119

[56] References Cited

U.S. PATENT DOCUMENTS

| | | | |
|---|---|---|---|
| 107,808 | 9/1870 | Phillips | 30/166.3 |
| 297,816 | 4/1884 | Ledward | 30/166.3 |
| 788,236 | 4/1905 | Bartholomew | 30/166.3 |
| 3,045,321 | 7/1962 | McDermott | 29/78 |
| 3,079,669 | 3/1963 | Bryant | 29/78 |
| 4,240,806 | 12/1980 | Frantzen | 51/295 |

Primary Examiner—William A. Powell
Attorney, Agent, or Firm—Charles D. Gunter, Jr.

[57] ABSTRACT

A method is shown for manufacturing a sheet metal tool from a metal blank in which a predetermined pattern of etching resistant material is applied to the back surface of the metal blank to define exposed areas separated by resist areas. A layer of etching resistant material is also applied to the front surface of the metal blank which overlies at least the exposed areas on the back surface of the metal blank. The exposed areas on the back surface are then subjected to etching treatment through the exposed areas to form a tooth shape with a cutting edge. The etching treatment is applied solely from the back surface of the metal blank, whereby the cutting edge is so formed terminate in sharpened surfaces in the plane of the front surface, protected by the layer of the etching resistant material on the front surface of the metal blank.

13 Claims, 3 Drawing Sheets

CHEMICALLY MACHINED SHEET METAL CUTTING TOOLS AND METHOD

BACKGROUND OF THE INVENTION

1. Field of the Invention:

The present invention relates to sheet metal tools of the type used for cutting and abrading operations and, specifically, to a method for chemically machining such tools to provide cutting teeth of unique and highly efficient shapes.

2. Description of the Prior Art:

Thin cutters and files, by their very design, have traditionally been very dull. They tend to load with the material being cut and clog. This necessitates cleaning before more material can be removed from the work surface. Because of this loading condition, most users rub material off the work surface by friction instead of actually removing material by creating a chip. It was very difficult to create a sharp cutting edge on prior art cutters and files because of the manufacturing techniques utilized. The problem was increased if the cutter or file in question had a multiplicity of cutting edges. The prior art also required that most cutters or files be stiff or rigid, which generally prohibited the cutter or file from conforming to a curved shape. Although abrasive papers were introduced in an attempt to solve this problem, the paper or cloth abrasive media tended to rub off material and create heat rather than cut material from the work surface.

Many of the cutters or files that are manufactured at the present time are punched out of a suitable sheet metal material. The material is passed through a punch and die, thereby imparting holes in the metal that are bent to provide the "set" which is necessary to make the desired tooth profile. The state-of-the-art cutters and files lack a preferred degree of sharpness. This is partially the result of the cutting edges being formed by the ragged die cuts in the metal blank. More expensive cutters and files have ground edges, however this grinding process is limited in application and limited in possible tooth arrangements because the grinding wheel or broach is required to enter and exit the tooth in a straight line. As a result, the available tooth patterns are relatively simple and linear.

Because of the high cost of tooling and grinding, attempts have been made in the prior art to manufacture sheet metal files by means of chemical etching processes. These endeavors have not generally met with commercial success because the end product tended to do more rubbing than cutting. This is primarily due to lack of side, frontal and/or top relief in the etched individual tooth patterns. U.S. Pat. No. 3,045,321 to McDermott is an example of such an abrading device. Etching through duplicate patterns of resists applied to opposite sides of a metal blank so that the etched cavities penetrate completely through the blank from opposite sides works very poorly in practice. As will be explained, the resulting reliefs or clearances extend in the wrong direction, causing the tool to rub more than it will cut.

U.S. Pat. No. 4,240,806 to Francen, is an improvement over the McDermott manufacturing method and makes use of special resist patterns on the metal blank. However, this patent also lacks sufficient top relief or clearance due to the geometry created by the chemical breakdown of metal as it is removed from the metal blank during the etching process. As a result, the tool tends to rub the work surface rather than cut and has the undesirable characteristic loading or clogging previously discussed.

It is an object of the present invention to provide an improved chemical machining method for manufacturing cutting tools which overcomes the previously mentioned shortcomings.

Another object of the invention is to provide a greater array of tooth designs for such tools that more efficiently cut a work material than the presently available designs.

Another object of the invention is to provide a linear file blade which can be mounted in a tensioned state within a frame to be used as an improved rasp or as a hacksaw.

Another object of the invention is to provide an improved linear or circular file which can be used with a backing plate for the purpose of providing required stiffness or rigidity.

Another object of the invention is to provide an improved flexible etched file that can be used to work irregularly shaped work surfaces.

Another object of the invention is to provide an improved sheet metal file and method of manufacture that eliminates the necessity of grinding the cutting edges or the use of expensive dies and fixtures.

Another object of the invention is to provide a manufacturing method which provides the top and side tooth relief angles necessary to efficiently remove material from a work surface.

SUMMARY OF THE INVENTION

The manufacturing method of the invention is used to form a sheet metal tool, such as an abrading or cutting tool, from a metal blank of the type having a generally flat, front surface, an opposite back surface and a peripheral edge. A predetermined pattern of etching resistant material is applied to the back surface of the metal blank, defining exposed areas separated by resist areas. A layer of etching resistant material is applied to the front surface of the metal blank which overlies at least the exposed areas on the back surface of the metal blank. The exposed areas on the back surface of the metal blank are subjected to etching treatment through the exposed areas to form a tooth shape with a cutting edge, the etching treatment being applied solely from the back surface of the metal blank, whereby the cutting edges so formed terminate in sharpened surfaces in the plane of the front surface and protected by the layer of etching resistant material on the front surface of the metal blank.

Preferably, the exposed areas on the back surface of the metal blank are subjected to etching treatment to form a tooth shape and an associated tooth opening in each of the exposed areas. Each tooth shape is preferably formed with a cutting edge opposite a tooth base. At least selected teeth are bent along their respective bases to bring their respective cutting edges above the plane of the front surface of the metal blank.

In certain embodiments, the teeth are formed with cutting edges opposite a tooth base, the teeth also having opposing side edges. In order to reduce stress at the base region, the area proximate the tooth side edges can be etched equally from the direction of both the front surface of the metal blank and the rear surface. The cutting edge of the tooth continues to be etched from the direction of the rear surface only.

In another embodiment of the invention, the previously described resist pattern is alternated on the front and back surfaces of the metal blank, so that alternating exposed areas on the back surface are overlaid by a layer of resist on the front surface and so that alternating exposed area on the front surface are overlaid by a layer of resist on the back surface. The exposed areas on the back surface of the metal blank are then subjected to etching treatment through the exposed areas to form a tooth shape and an associated tooth opening as previously described. The exposed areas on the front surface of the metal blank are subjected to etching treatment through the exposed areas to form a tooth shape, with the etching treatment being applied from the opposite direction of the etching treatment applied to the back surface.

Those teeth formed with their sharpened surfaces in the plane of the back surface are then bent along their respective bases to bring their respective cutting edges above the plane of the back surface of the metal blank and those teeth formed with their sharpened surfaces in the plane of the front surface are bent along their respective bases to bring their respective cutting edges above the plane of the front surface of the metal blank. By applying the resist pattern unevenly to the front and rear surfaces of the metal blank, a tooth image is formed which is slightly smaller on one side of the metal blank than the other allowing the back rake angle of the tooth to be controlled and optimized for cutting various materials.

A sheet metal file, manufactured by the process of the invention, includes a plurality of photochemically machined teeth. Any given tooth is etched solely from one side of a metal blank. Alternate teeth or groups of teeth may be etched from opposite sides to create a file that cuts on both sides. Each tooth is bent at its base to bring the cutting edge of the tooth above the surface of the blade. In the case of a circular or linear saw blade, every other tooth of the blade is etched from the opposite side of the metal blank. All of the etching of any particular tooth, however, is accomplished from the same side of the metal blank.

Additional objects, features and advantages will be apparent in the written description which follows.

BRIEF DESCRIPTION OF THE DRAWINGS

in FIG. 7;

in FIG. 9;

DETAILED DESCRIPTION OF THE INVENTION

Figure 1:
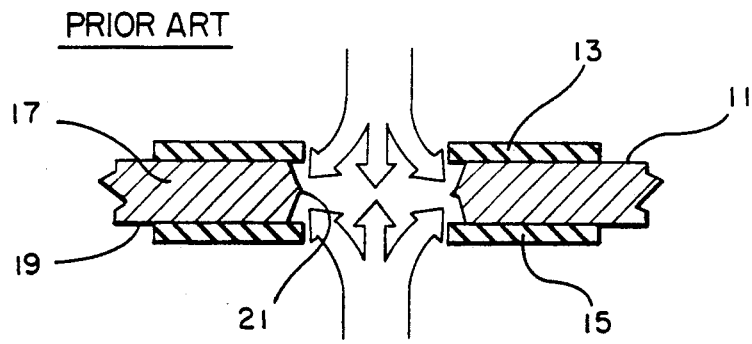
FIG. 1 is a partial, cross-sectional schematic illustration of the prior art chemical etching process in which the etchant is applied from both sides of the metal blank to form a cutting tooth.

The present invention utilizes chemical etching or milling to produce files and cutters that have teeth and slots for material removal, allowing great flexibility in tooth design, arrangement and selection of material for the cutters or files. Cutters and files made by the method of the present invention are thinner, more flexible, sharper and less likely to load than those made with the prior art techniques. The method is well adapted for photochemical etching processes in which the resist patterns used to form the tooth shapes are computer generated. The use of computer automated design for generation of such optical tooling permits custom configurations of teeth spacing and arrangements that optimize tooth geometry.

Chemical etching techniques are known in the art for making devices or tools having cutting teeth such as files, rasps, saw blades, and the like. Such techniques are described, e.g., in U.S. Pat. No. 4,240,806, issued Dec. 23, 1980, and U.S. Pat. No. 3,045,321, issued July 24, 1962, the disclosure of which is incorporated herein by reference. A metal blank is provided with those areas of the blank which are to form teeth, ridges or other cutting elements being selectively coated with a material which prevents the etching fluid from contacting and acting on them and other areas of the blank are left exposed for the etching treatment. The etching fluid first acts on the surface areas which are not protected by the resist material, and as the etching proceeds, the material not protected by the resist is removed. The pattern of the resist material which is coated on the blank is varied according to the character of the cutting elements that are desired. For example, a pattern of isolated areas where the etching is to start may be formed in an otherwise continuous etching resist coating, or isolated areas of the etching resist coating may be formed on the otherwise exposed surface areas of the blank. The actual etching fluids and resist materials utilized will be familiar to those skilled in the art and do not form a part of the present invention.

The cutting elements of the invention may be formed on any material that is suited to etching treatment. Most of the known suitable materials are metals. Steels of various compositions and hard alloys are best suited for use as the blank material where long life and adaptability to the cutting of hard substances is required. For example, stainless steel sheets (Rc 30/55, 300/400 Series Stainless Steel) or mild steels adapted to be hardened subsequent to the etching treatment have been used successfully as the blank or body of the abrading devices of the invention. After a blank has been formed with cutting teeth by the etching treatment of the invention, the product may be given a hardening treatment, e.g., case hardening treatment. For abrading wood and forming smooth surfaces on any of the softer materials, the blank may be composed of one of the softer metals, e.g., nickel, aluminum, copper or brass or any suitable allow. Economy in the use of metal is obtained by using thin sheets or strips of metal as the blank material. Sheets ranging from about 0.002 inch to about 0.02 inches thick have adequate strength and desirable flexibility for many abrading uses.

The devices of the invention are preferably photochemically machined from sheet metal. The photochemically machined sheet metal tools are generally divided into two groups: (1) tools with cutting teeth on the flat part of the blade, used for planing or shaping like a file or sandpaper; (2) tools with cutting teeth on the edge of the blade for sawing and grooving. Unlike files and sandpaper, the first group of blades, made by the present method, will not "load" because removed material passes easily through the openings in the blade. Either type of tool may be manufactured as strips, sheets, disks, belts, tubes or drums to be used as either hand tools or power tools.

Figure 2:
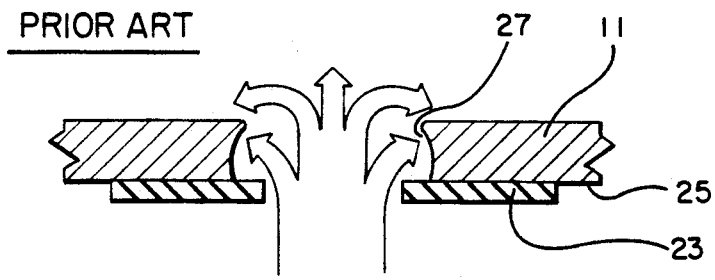
FIG. 2 is a similar view of another prior art technique in which the etchant is applied from a single direction to form a cutting tooth.

FIGS. 1 and 2 illustrate the generally accepted prior art practices for etching cutting tools from sheet metal. A metal blank 11 has applied thereto a predetermined pattern of etching resistant material. In the embodiment of FIG. 1, the etching resistant material 13, 15 is applied to both the front and back surfaces 17, 19 of the metal blank. The etchant spray, illustrated by the arrows in FIG. 1, is applied in two-sided fashion, creating a relatively small, blunt ridge 21 on the interior of the opening between the etchant resistant materials 13, 15. In the embodiment of FIG. 2, a protective resist layer 23 is applied only on the back surface 25 of the metal blank 11. Without the protective resist layer on the front surface of the metal blank, the sharp edge 27 is quickly attacked and blunted by the etchant.

Figure 3:
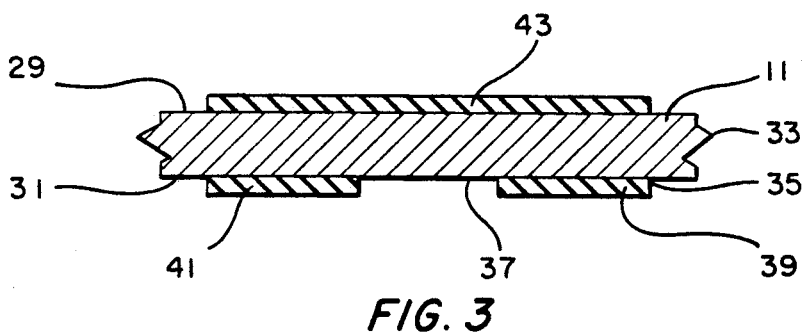
FIG. 3 is a partial, cross-sectional view of a metal blank used in the method of the invention showing the resist pattern thereof.

FIG. 3 illustrates the etching arrangement used in the method of the invention in which a metal blank 11 has a generally flat, front surface 29, an opposite, back surface 31 and a peripheral edge (shown broken away as 33). In the method used to form the cutting tools of the invention, a predetermined pattern of etching resistant material 35 is applied to the back surface 31 of the metal blank 11, the pattern defining exposed areas 37 separated by resist areas 39, 41. A layer of etching resistant material 43 is applied to the front surface 29 of the metal blank 11 which overlies at least the exposed areas 37 on the back surface 31 of the metal blank 11.

Figure 4:
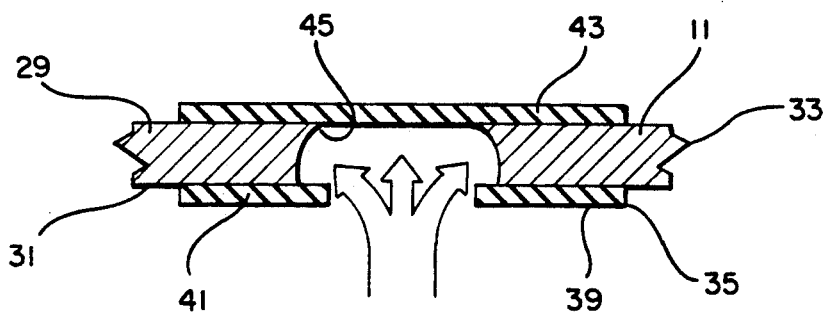
FIG. 4 is a view similar to FIG. 3 showing the next step in the method of the invention in which etchant is applied from one side of the metal blank only to form the desired tooth pattern.

As shown in FIG. 4, the exposed areas 37 on the back surface 31 are then subjected to etching treatment through the exposed areas 37 to form a tooth shape with a cutting edge 45, the etching treatment (as indicated by the arrows in FIG. 4) being applied solely from the back surface 31 of the metal blank 11. In this way, the cutting edges 45 so formed terminate in sharpened surfaces in the plane of the front surface 29, protected by the layer 43 of etchant resistant material on the front surface 29 of the metal blank 11.

Figure 5:
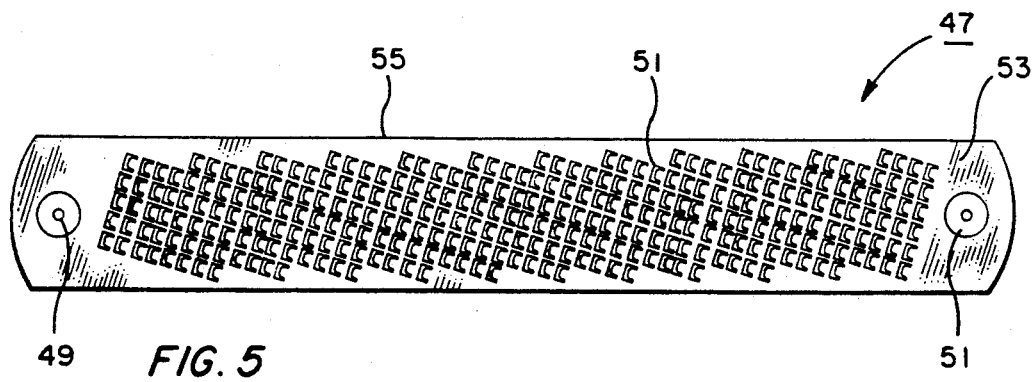
FIG. 5 is a plan view of a sheet metal tool manufactured by the method of the invention.

FIG. 5 shows a sheet metal tool, designated generally as 47, manufactured by the method of the invention. In the embodiment of FIG. 5, the sheet metal tool 47 is a micro-planing strip provided with reinforcing steel eyelets 49, 51 which allow the strip to be mounted within, e.g., a hacksaw frame (not shown). The tooth shapes 51 are formed in the flat, front surface 53 of the metal blank, within the peripheral edge 55.

Figure 6:
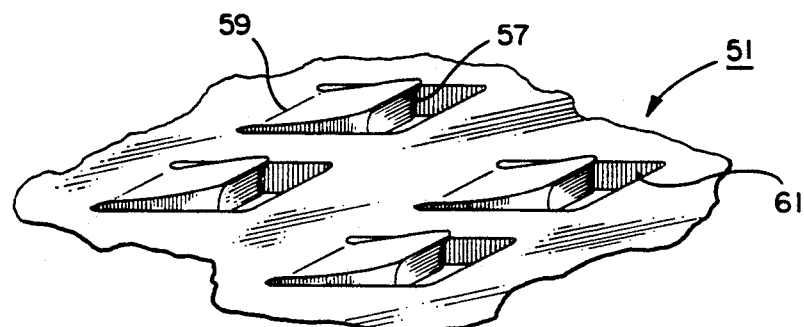
FIG. 6 is an enlarged, isolated view of the cutting teeth of the tool of FIG. 5.

FIG. 6 is an isolated view of selected tooth shapes 51 illustrating the thin, cutting edges 57 which are formed in the frontal portion of the tooth shapes. Each tooth shape has an associated tooth opening 61 which is formed in the metal blank 11. In the embodiment of the invention illustrated in FIGS. 5-6, at least selected teeth are bent along their respective bases 59 to bring their respective cutting edges 57 above the plane of the front surface 53 of the metal blank 11.

Figure 7:
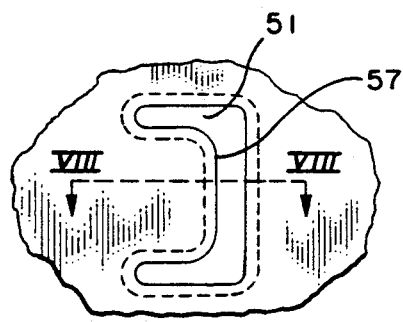
FIG. 7 is a simplified, top view of a single tooth of the tool of FIG. 5 manufactured according to the method of the invention.
Figure 8:
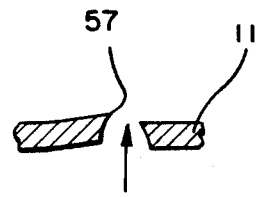
FIG. 8 is a partial, cross-sectional view taken along lines VIII.—VIII.

FIGS. 7 and 8 illustrate the preferred tooth shapes of the invention for sheet metal files or planing blades which are especially adapted for use as hand tools. The blade (FIG. 5) can be held under tension in a common hacksaw frame (not shown). If not stretched too tightly, the blade will flex to conform to and work rounded or contoured surfaces. Although the tooth design illustrated in FIG. 7 is relatively simple, it will be appreciated that the tooth could be of various sizes, shapes or proportions. For instance, the cutting edge of each tooth could be rounded, serrated, pointed, etc., without increasing the manufacturing cost. Although the sheet metal file (FIG. 5) is planar in design, it will be understood that, due to the thin nature of the metal blank used to form the file, the file could also be formed into a tube, a half round shape, a triangle, or other rigid shape. FIG. 8 illustrates the unidirectional application of the etchant spray (illustrated by the arrow) which is used to form the cutting edge 57 in the metal blank 11.

Figure 9:
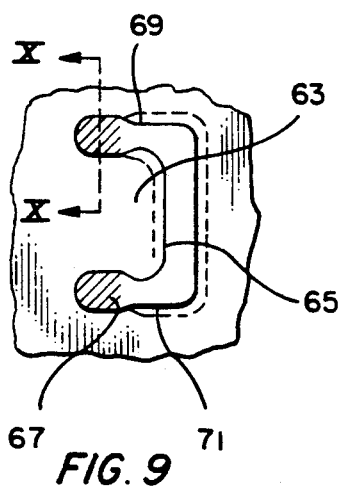
FIG. 9 is a view of a tooth similar to FIG. 7 but adapted for use as a planning blade for a power tool.
Figure 10:
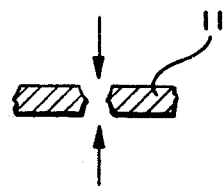
FIG. 10 is a partial, cross-sectional view taken along lines X.—X.

FIGS. 9 and 10 illustrate a similar tooth shape 63 having a cutting edge 65, the tooth shape being designed for use with a power tool. The power tool tooth illustrated in FIG. 9 is identical to the hand tool tooth illustrated in FIG. 7 with the exception of the treatment of the root area 67 of the tooth. FIG. 10 is a sectional view of the root area illustrating the application of etchant spray in equal amounts from each side of the metal blank 11, thereby creating straighter walls on the sides of the teeth 69, 71 while still generating the necessary, thin cutting edge on the frontal portion 65. Note that the cutting edge 65 of each tooth continues to be formed by applying etchant spray in a single direction from the back to the front of the metal blank. This technique has been found to minimize internal stresses which are exerted at the base of the tooth in power tool applications.

Figure 11:
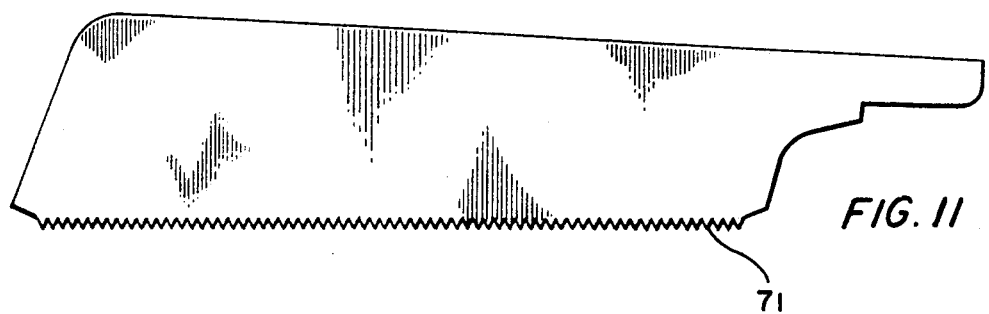
FIG. 11 is a plan view of a cutting tool manufactured by the method of the invention.
Figure 12:
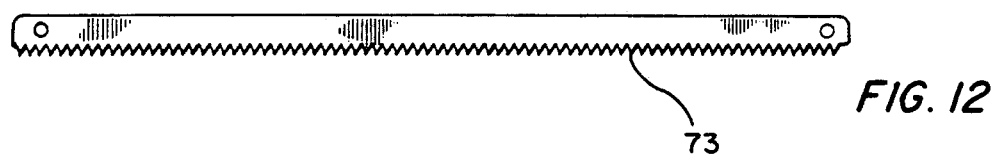
FIG. 12 is a plan view of another cutting tool manufactured by the method of the invention.
Figures 13, 14:
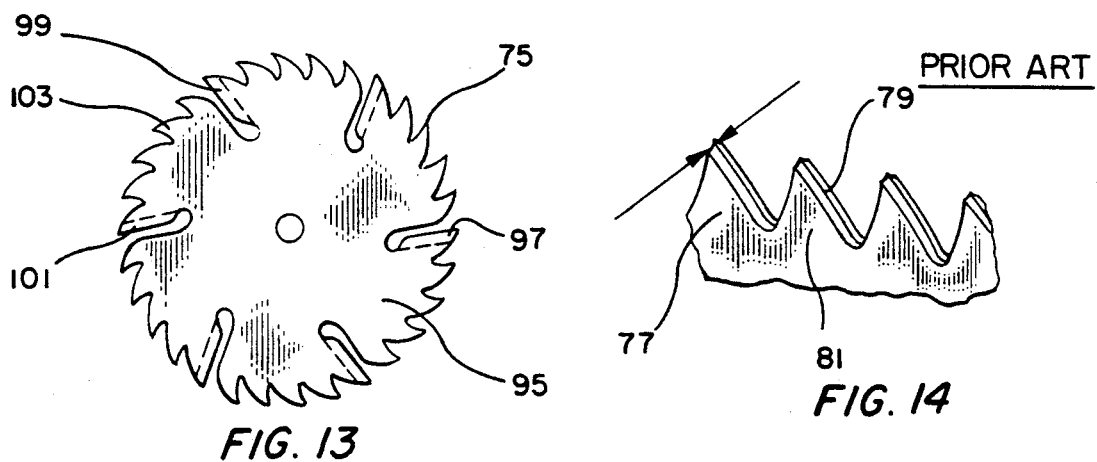
FIG. 13 is a plan view of a circular saw blade manufactured by the method of the invention.
FIG. 14 is a simplified, schematic view of the prior art technique for manufacturing circular or linear saw blades.

FIGS. 11, 12 and 13 illustrate various cutting tools manufactured according to the method of the invention in which the cutting edges 71, 73, 75 are on the peripheral edge of the tool, rather than being on the flat surface within the peripheral edge. FIG. 14 illustrates the prior art manufacturing technique in which etchant (illustrated by the arrows in FIG. 14) is applied in identical manner on both sides of the metal blank 77 thereby leaving a ridge 79 in the center of each tooth 81.

Figure 15:
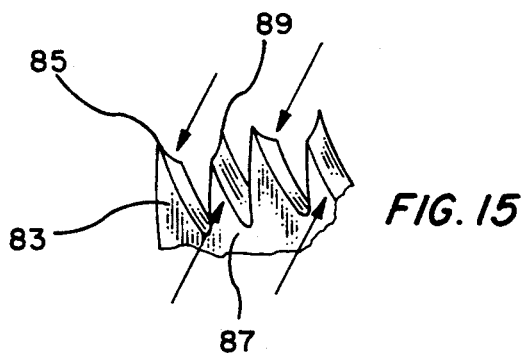
FIG. 15 is a simplified, schematic view, similar to FIG. 14, but illustrating the method of the invention.
Figure 16:
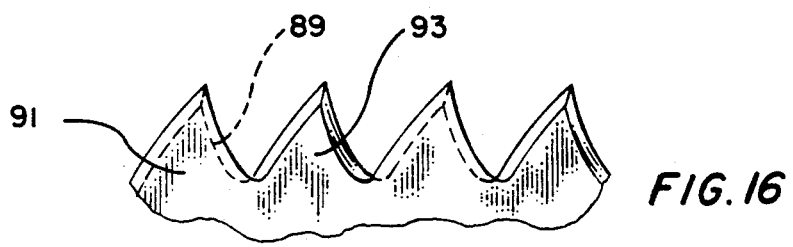
FIG. 16 is a simplified, plan view of teeth for a circular or linear saw blade manufactured according to the method of the invention.

FIGS. 15 and 16 illustrate the improved method of the invention. In the case of teeth formed along the peripheral edge of the cutting tool, a predetermined pattern of etching resistant material is applied to the back surface of the metal blank to define exposed areas separated by resist areas. A layer of etching resistant material is also applied to the front surface of the metal blank which overlies the exposed areas on the back surface of the metal blank. The previously described resist pattern is alternated on the front and back surfaces so that alternating exposed areas on the back surface are overlaid by a layer of resist on the front surface and so that alternating exposed areas on the front surface are overlaid by a layer of resist on the back surface. The exposed areas on the back surface of the metal blank are subjected to etching treatment through the exposed areas to form a tooth shape 83 having a cutting edge 85. The exposed areas on the front surface of the metal blank are subjected to etching treatment through the exposed areas to form a tooth shape 87 having a cutting edge 89, the etching treatment being applied solely from the front surface of the metal blank. Selected cutting teeth can then be bent so that those teeth formed with their sharpened surfaces in the plane of the back surface are bent along their respective bases to bring their respective cutting edges above the plane of the back surface of the metal blank and those teeth formed with their sharpened surfaces in the plane of the front surface are bent along their respective bases to bring their respective cutting edges above the plane of the front surface of the metal blank.

Preferably, the resist pattern which is applied to the front and rear surfaces of the metal blank is applied unevenly (illustrated by the dotted lines in FIG. 16), thereby forming a tooth image which is slightly smaller on one side of the metal blank than the other. If the resist images on opposite sides are unequal and the metal is etched through from the side with the smaller image (89 in FIG. 16), a razor sharp edge (89 in FIG. 15) is formed on the side of the metal blank with the larger image. This technique allows each tooth to be formed with a selected back rake. Note that image size and etch direction are reversed from tooth 91 to tooth 93.

FIG. 13 shows a circular saw blade 95 having its cutting edge 103 which is oriented 90° from the cutting edges of the sheet metal file illustrated in FIG. 5. By applying the etch pattern with a smaller resist pattern on the backside of the tooth than on the front side, it is possible to provide the necessary top clearance, side clearance and clearance on the outside diameter of the saw. This side differential in the etching resist pattern is necessary in order to create a series of etched teeth that have the proper amount of relief on the sides of the tooth profile so that the teeth can cleanly remove material from a work surface.

As illustrated in FIG. 15, the resist patterns are alternated from tooth 83 to tooth 87 with every other tooth being etched from the opposite side. All of the etching of any particular tooth is, however, accomplished from the same side. In the embodiment of FIG. 13, the circular saw blade 95 is provided with planing teeth 97, 99, 101 which eliminate the necessity of bending every tooth on the blade. The long, sharp points (illustrated in FIG. 15) of the unequally etched teeth give these blades a slicing action that is quite different from the scrapping or chipping action of conventional saw blades and leave an exceptionally smooth finish on the work surface. Although the teeth in FIG. 15 are only moderately curved, it will be understood that they could have any desired form. In contrast, conventional stamping and grinding methods have traditionally restricted the design of the prior art teeth to straight-edged forms.

An invention has been provided with several advantages. The photochemically machined cutting tools of the invention have tooth shapes which can be made in any conceivable size, shape or pattern without the use of expensive dies or fixtures. The cutting edges of the tooth shapes are razor sharp, without the necessity of grinding or honing. The cutting tools of the invention are well adapted for use as sheet metal cutting tools including circular and linear wood cutting saw blades, micro-planing blades for hand tools and micro-planing blades for power tools. The files and cutters produced by the method of the invention have teeth with associated slots for removal of material from the work surface. The cutters and files made by the method of the invention are thinner, more flexible, sharper and less likely to load than those made with the prior art techniques.

While the invention has been shown in only one of its forms, it is not thus limited but is susceptible to various changes and modifications without departing from the spirit thereof.

I claim:

1. A method of manufacturing a sheet metal tool from a metal blank of the type having a generally flat, front surface, an opposite back surface and a peripheral edge, the method comprising the steps of:

applying to the back surface of the metal blank a predetermined pattern of etching resistant material defining exposed areas separated by resist areas; and applying a layer of etching resistant material to the front surface of the metal blank which overlies at least the exposed areas on the back surface of the metal blank;

subjecting the exposed areas on the back surface of the metal blank to etching treatment through the exposed areas to form a tooth shape with a cutting edge, the etching treatment being applied solely from the back surface of the metal blank, whereby the cutting edges so formed terminate in sharpened surfaces in the plane of the front surface and protected by the layer of etching resistant material on the front surface of the metal blank.

2. The method of claim 1, wherein the tooth shapes which are formed are for-med in the flat, front surface of the metal blank, within the peripheral edge thereof.

3. The method of claim 1, wherein the tooth shapes which are formed are formed along at least a portion of the peripheral edge of the metal blank.

4. A method of manufacturing a sheet metal tool from a metal blank of the type having a generally flat, front surface, an opposite back surface and opposing side edges, the method comprising the steps of:

applying to the back surface of the metal blank a predetermined pattern of etching resistant material defining exposed areas separated by resist areas; and applying a layer of etching resistant material to the front surface of the metal blank which overlies the exposed areas on the back surface of the metal blank;

subjecting the exposed areas on the back surface of the metal blank to etching treatment through the exposed areas to form a tooth shape and an associated tooth opening in each of the exposed areas, each tooth shape being formed with a cutting edge opposite a tooth base, the etching treatment being applied solely from the back surface of the metal blank, whereby the cutting edges so formed terminate in sharpened surfaces in the plane of the front surface and protected by the layer of etching resistant material on the front surface of the metal blank;

bending at least selected teeth so formed along their respective bases to bring their respective cutting edges above the plane of the front surface of the metal blank.

5. The method of claim 4, wherein each tooth shape which is formed has a cutting edge opposite a tooth base and opposing side edges which terminate in a root region of the tooth, the method further comprising the steps of etching the area proximate the root region of each tooth equally from the direction of both the front surface of the metal blank and the rear surface.

6. A method of manufacturing a sheet metal tool from a metal blank of the type having a generally flat, front surface, an opposite back surface and opposing side edges, the method comprising the steps of:

applying to the back surface of the metal blank a predetermined pattern of etching resistant material defining exposed areas separated by resist areas; and applying a layer of etching resistant material to the front surface of the metal blank which overlies the exposed areas on the back surface of the metal blank;

alternating the previously described resist pattern on the front and back surfaces so that alternating exposed areas on the back surface are overlaid by a layer of resist on the front surface and so that alternating exposed areas on the front surface are overlaid by a layer of resist on the back surface;

subjecting the exposed areas on the back surface of the metal blank to etching treatment through the exposed areas to form a tooth shape and an associated tooth opening in each of the exposed areas, each tooth shape being formed with a cutting edge opposite a tooth base, the etching treatment being applied solely from the back surface of the metal blank, whereby the cutting edges so formed terminate in sharpened surfaces in the plane of the front surface and protected by the layer of etching resistant material on the front surface of the metal blank;

subjecting the exposed areas on the front surface of the metal blank to etching treatment through the exposed areas to form a tooth shape and an associated tooth opening in each of the exposed areas, each tooth shape being formed with a cutting edge opposite a tooth base, the etching treatment being applied solely from the front surface of the metal blank, whereby the cutting edges so formed terminate in sharpened surfaces in the plane of the back surface and protected by the layer of etching resistant material on the back surface of the metal blank;

bending those teeth formed with their sharpened surfaces in the plane of the back surface along their respective bases to bring their respective cutting edges above the plane of the back surface of the metal blank and bending those teeth formed with their sharpened surfaces in the plane of the front surface along their respective bases to bring their respective cutting edges above the plane of the front surface of the metal blank.

7. The method of claim 6, wherein the resist pattern which is applied to the front and rear surfaces of the metal blank is applied unevenly, thereby forming a tooth image which is slightly smaller on one side of the metal blank than the other.

8. A chemically machined, sheet metal file formed from a metal blank of the type having a generally flat, front surface, an opposite back surface and opposing side edges, comprising:

a plurality of cutting teeth chemically etched in the metal blank, each tooth being defined by a tooth shape and an associated tooth opening which extends completely through the metal blank, each tooth shape being formed with a cutting edge and a tooth base, the etching treatment which is used to form the cutting teeth being applied in one direction only from the back surface toward the front surface of the metal blank, whereby the cutting edges so formed terminate in sharpened surfaces in the plane of the front surface, at least selected teeth so formed being bent along their respective bases to bring their respective cutting edges above the plane of the front surface of the metal blank.

9. The chemically machined, sheet metal file of claim 8, wherein the metal blank is a flat, flexible strip which is mounted in a frame to place the strip in a state of tension.

10. The chemically machined, sheet metal file of claim 8, wherein a back plate is affixed to at least one side of the metal blank to provide increased rigidity for the file.

11. The chemically machined, sheet metal file of claim 8, wherein each tooth shape is formed with opposing side edges in addition to a cutting edge and a tooth base, the opposing side edges terminating in root regions which are etched equally from both sides of the metal blank, the cutting edge being etched solely from one side of the metal blank.

12. A chemically machined, circular blade formed from a metal blank of the type having a generally flat, front surface, an opposite back surface and a peripheral edge, comprising:

a plurality of cutting teeth chemically etched about the peripheral edge of the metal blank, each tooth being defined by a tooth shape and an associated tooth opening which extends completely through the metal blank, each tooth shape being formed with a cutting edge and a tooth base, the etching treatment which is used to from the cutting teeth being applied in one direction only for each tooth being formed, the direction of etching being alternated in a repeating pattern around the peripheral edge of the metal blank, whereby the cutting edges so formed terminate in sharpened surfaces which are alternately located in the plane of the front surface and the plane of the back surface of the metal blank, those teeth formed with their sharpened surfaces in the plane of the back surface being bent along their respective bases to bring their respective cutting edges above the plane of the back surface of the metal blank and those teeth formed with their sharpened surfaces in the plane of the front surface being bent along their respective bases to being their respective cutting edges above the plane of the front surface of the metal blank.

13. The chemically machined, circular saw blade of claim 12, wherein the resist pattern which is applied to the front and rear surfaces of the metal blank is applied unevenly, thereby forming a tooth image which is slightly smaller on one side of the metal blank than the other.

* * * * *